United States Patent
Bay

[11] 3,780,642
[45] Dec. 25, 1973

[54] CASSEROLE

[76] Inventor: Eduard Bay, Hohlstrasse 26, 5412 Ransbach-Baumbach, Germany

[22] Filed: Feb. 11, 1972

[21] Appl. No.: 225,463

[30] Foreign Application Priority Data
Oct. 29, 1971 Great Britain.................. 20,402/71

[52] U.S. Cl..................... 99/347, 126/390, 220/4 B
[51] Int. Cl. ............................................. A47j 37/10
[58] Field of Search...................... 99/347, 346, 403, 99/425, 446; 126/369, 384, 390; 220/4 B, 72, 83

[56] References Cited
UNITED STATES PATENTS

| | | | |
|---|---|---|---|
| D137,961 | 5/1944 | Kapner et al. ................ 99/425 UX |
| 151,246 | 5/1874 | Schreiber............................ 126/390 |
| 280,661 | 7/1883 | Pech .................................. 126/390 |
| 307,192 | 10/1884 | Halstead .............................. 99/403 |
| 797,314 | 8/1905 | Owens................................ 220/4 B |
| 1,330,209 | 2/1920 | Massing ............................... 99/347 |
| 2,267,486 | 12/1941 | West................................. 99/347 X |
| 2,336,699 | 12/1943 | Neth et al. ........................ 99/347 X |
| 2,527,395 | 10/1950 | Burditt................................ 99/347 |
| 2,659,362 | 11/1953 | Strehl................................. 126/390 |
| 3,141,455 | 7/1964 | Dumbeck........................... 126/369 |

*Primary Examiner*—Billy J. Wilhite
*Assistant Examiner*—Arthur O. Henderson
*Attorney*—Ralph D. Dinklage et al.

[57] ABSTRACT

A casserole in which the container for the food is formed of porous ceramic material and the lid for the container is formed of impervious material. The underside of the lid is provided with a plurality of spaced, depending ribs. During cooking, condensate collecting on the underside of the lid drips from the ribs onto the food in the casserole.

7 Claims, 4 Drawing Figures

PATENTED DEC 25 1973  3,780,642

CASSEROLE

The invention relates to a casserole made from porous ceramic material. Such casseroles have, in comparison with casseroles made from glass or glazed ceramic, the advantage that the foodstuff to be casseroled is prepared in such manner that it is better protected.

This advantage is achieved in consequence of the fact that the porous carrerole is, before use, introduced into water so that it absorbs water like a sponge. Consequently, during the cooking procedure, the material to be cooked is first of all steamed and only thereupon casseroled.

Casseroles are known which either are made entirely from glass or have a lower portion consisting of glazed ceramic. These known casseroles have, it is true, the advantage that the material to be cooked can be observed during cooking through the glass lid serving as the upper part. However, adhesion and also burning-on of the foodstuff undergoing cooking readily takes place due to the smooth, non-porous inner surface of the casserole.

With the casserole according to the invention, these disadvantages are avoided or minimized.

According to the present invention we provide a casserole consisting of a lower portion made of porous ceramic and upper portion made of heat-resistant glass, preferably transparent, serving as a lid or cover for the lower portion, the underside of the upper portion being provided with a plurality of, preferably approximately parallel, ridges spaced apart from each other. The ridges are intended to facilitate the dripping of the water from the underside of the lid or cover on the foodstuff below during the cooking thereof.

In this way it becomes possible to deal with the foodstuff to be casseroled in a well-protected manner and substantially without adhesion or burning-on, and also to observe the foodstuff through the glass lid.

In particular, however, the effect is achieved that during the cooking procedure the water sucked in by the pores of the lower element of the casserole evaporates inwardly and a portion thereof is precipitated on the smoother inner face of the lid made of heat-proof glass and from there drips on to the foodstuff to be cooked. In this way, the continuous moistening otherwise conventionally effected during cooking is automatically effected.

In order to further enhance the dripping effect, the underside of the lid or cover may be curved so that its central portion is lower than its periphery. Consequently, the condensed water preferentially drips on to the center of foodstuff undergoing cooking.

If desired, and in a preferred embodiment, the casserole is elongated and the ridges are approximately parallel to longitudinal axis of the casserole.

Thus, the casserole of the invention comprises a container for food to be held in the casserole, formed of porous ceramic material, and the lid for the container formed of impervious material, the underside of the lid having a plurality of spaced, depending ribs.

By "porous" is meant that liquid water is absorbed by a material. By "Impervious" is meant that liquid water and steam or water vapor are not absorbed by the material.

Preferably the ribs are elongated and disposed in generally parallel relation, and preferably the underside of the lid is convex with the central portion thereof, forming the lower part of the lid.

By way of example, preferred forms of the invention are shown diagrammatically in the accompanying drawing wherein.

Figure 1:
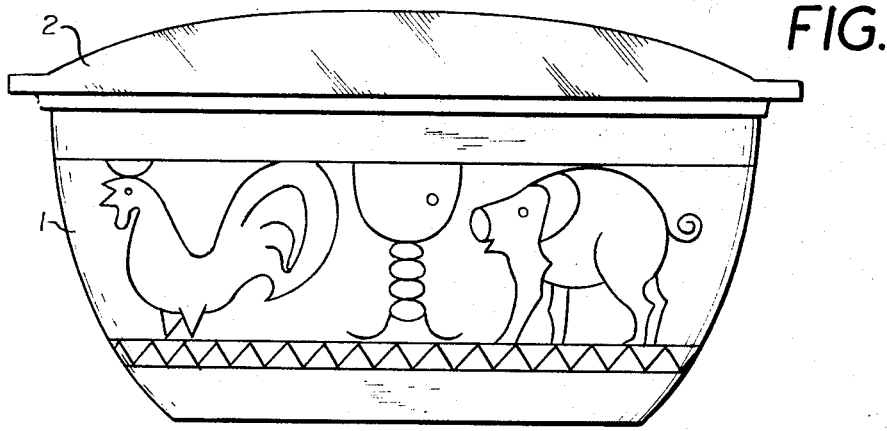
FIG. 1 shows and end elevation of a casserole bearing design.
Figure 2:
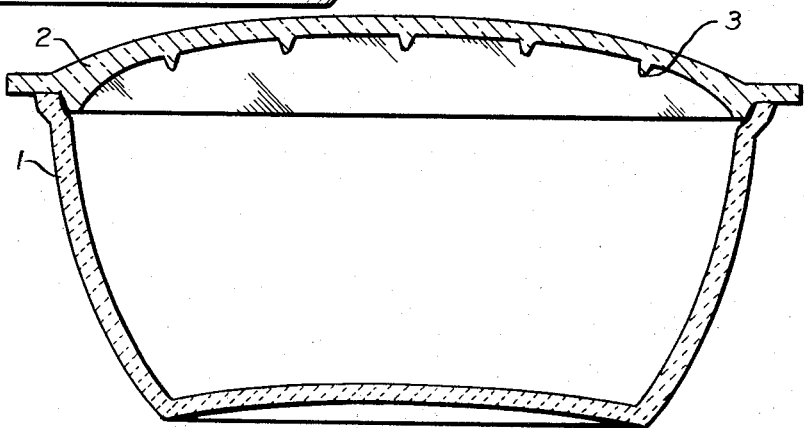
FIG. 2 is a section through the center of FIG. 1.
Figure 3:
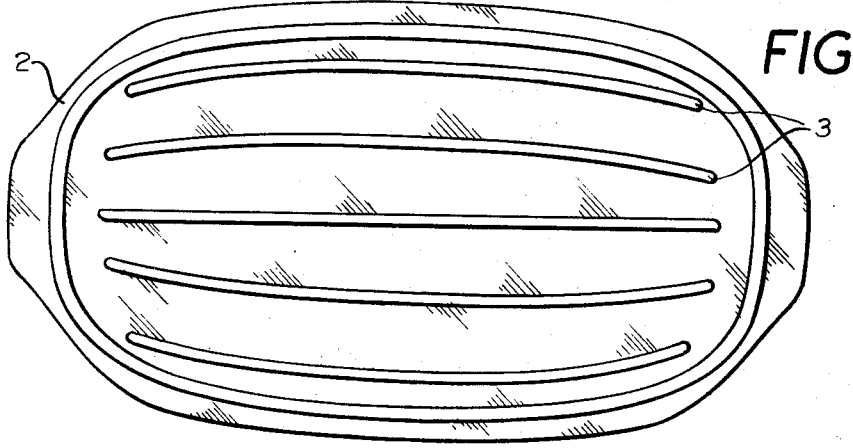
FIG. 3 is a plan view of the underside of the lid or cover shown in FIG. 2 and turned through 90°.
Figure 4:
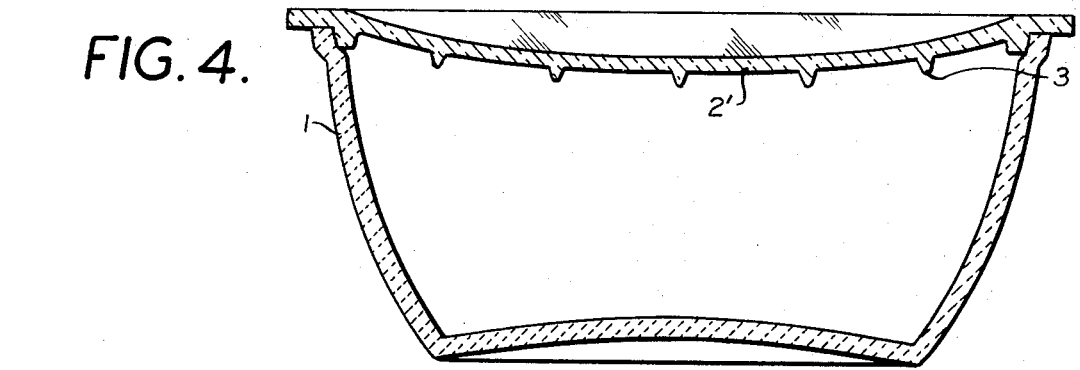
FIG. 4 is similar to FIG. 2 but modified in that the underside of the lid or the cover is convex with its center lower than its periphery.

The elongated casserole shown in the drawing has its lower portion 1 made of porous ceramic material of the usual and conventional material and construction and its upper portion 2 or 2' (FIG. 4) made from heat-proof transparent glass, e.g., Pyrex. Generally parallel elongated ridges or ribs 3 are provided on the underside of the lid or cover (I.e., the upper portion 2) to facilitate the dripping of the water from the underside of the lid or cover on the foodstuff below during the cooking thereof. A further enhancement of the dripping effect may be obtained by making the underside of the upper portion downwardly curved, i.e., convex, as shown in FIG. 4 so as to cause the water to drip preferentially on to the foodstuff in the central part of the casserole.

1. A casserole comprising:
   a. a container for food to be held in the casserole, formed of porous ceramic material,
   b. a lid for the container formed of impervious material and having a plurality of spaced means for facilitating the dripping of water depending from the underside of the lid.

2. Casserole according to claim 1, the lid being formed of glass.

3. Casserole according to claim 2, the glass lid being transparent.

4. Casserole according to claim 1, the means for facilitating the dripping of water from the underside of the lid being elongated ribs disposed in generally parallel relation.

5. Casserole according to claim 4, the underside of the lid being convex with the central portion thereof forming the lower part of the lid.

6. Casserole according to claim 4, the casserole being elongated, and the ribs being disposed generally parallel to the longitudinal axis of the casserole.

7. Casserole according to claim 5, the casserole being elongated, and the ribs being disposed generally parallel to the longitudinal axis of the casserole.

* * * * *